Nov. 14, 1967 H. J. LE VESCONTE ET AL 3,352,436

AUTOMOBILE STORAGE MEANS

Original Filed Oct. 7, 1963

3 Sheets-Sheet 1

INVENTORS

Harold J. Le Vesconte

Douglas P. Davis

Nov. 14, 1967 H. J. LE VESCONTE ET AL 3,352,436

AUTOMOBILE STORAGE MEANS

Original Filed Oct. 7, 1963

3 Sheets-Sheet 2

INVENTORS:
Harold J. LeVesconte
Douglas P. Davis

Nov. 14, 1967 H. J. LE VESCONTE ET AL 3,352,436

AUTOMOBILE STORAGE MEANS

Original Filed Oct. 7, 1963

3 Sheets-Sheet 3

INVENTORS:

Harold J. Le Vesconte

Douglas P. Davis

᠎United States Patent Office 3,352,436
Patented Nov. 14, 1967

3,352,436
AUTOMOBILE STORAGE MEANS

Harold J. Le Vesconte, 315 N. Louise St., Apt. 308, Glendale, Calif. 91206, and Douglas P. Davis, 911 E. Elmwood Ave., Burbank, Calif. 91506

Original application Oct. 7, 1963, Ser. No. 314,365. Divided and this application June 8, 1965, Ser. No. 465,831
7 Claims. (Cl. 214—16.1)

This invention relates to the art of parking automotive vehicles and constitutes a division of our co-pending application, Ser. No. 314,365, filed Oct. 7, 1963, now abandoned.

Heretofore, in parking automotive vehicles it has always been necessary to allow sufficient space in addition to the width of the vehicle to permit a driver to enter and leave the vehicle after it has been parked and the present invention is concerned with a means for making it possible for the drivers of individual vehicles to bring the vehicle up to a point opposite the space in which it is to be parked and thereafter by means engaging the vehicle to cause the vehicle to be moved into the space and to cause the vehicle to be removed from the space to a point at which entrance to and exit from the vehicle is possible. By such means it is possible to park, say, ten cars within a space laterally of the cars which otherwise would accommodate only seven cars.

With these considerations in mind, it is an object of the present invention to provide a means whereby an automobile may be parked in a space so narrow that the vehicle doors cannot be opened for entrance or exit of a person.

Another object of the invention is to provide a parking means permanently installed in a parking space for an automobile and which parking means remains connected to the automobile during the storage thereof to serve also as a securing means whereby the vehicle is securely locked into its parking place by virtue of such connection.

A further object of the invention is to provide a parking means of the type considered in the preceding objectives in which movement of the automobile under its own power effects the connection and disconnection thereof from the parking means.

Still another object of the invention is to provide an automobile parking means in which the foregoing objectives are realized in practice, which is simple in construction, economical to manufacture, requires no special skill to install, is easy to operate, and is reliable for its intended purpose.

Figure 1:
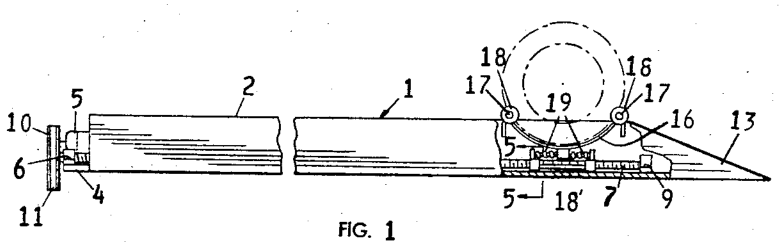
Figure 2:
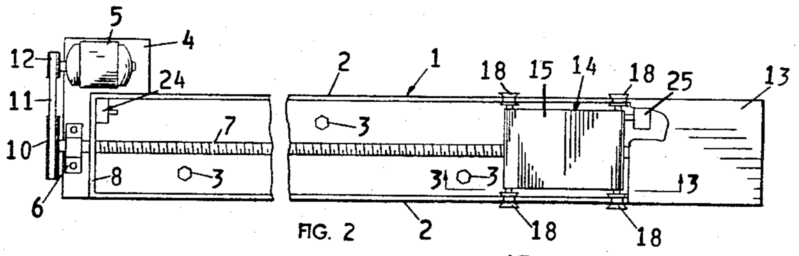
Figure 3:
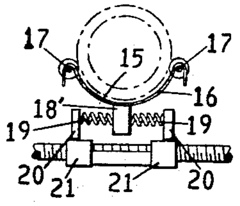
Figure 4:
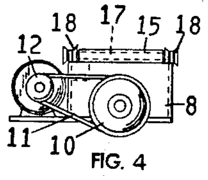
Figure 5:
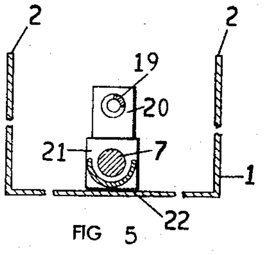
Figure 6:
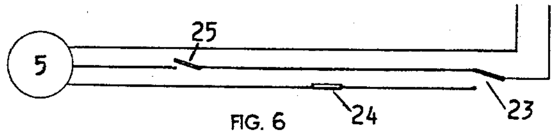
Figures 7A, 7B, 7C:
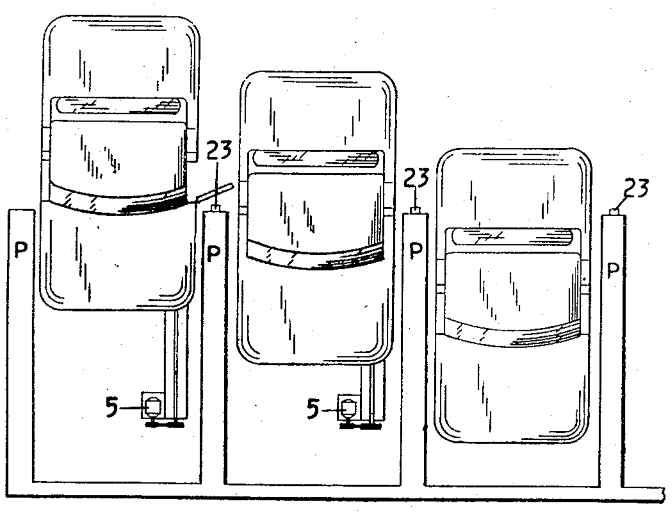
Figure 8:
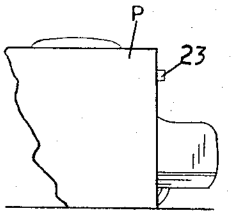
Figure 9:
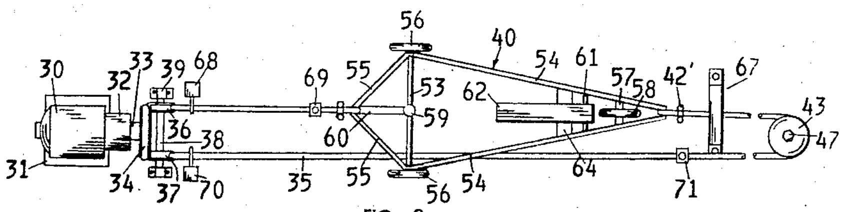
Figures 10, 11, 12:
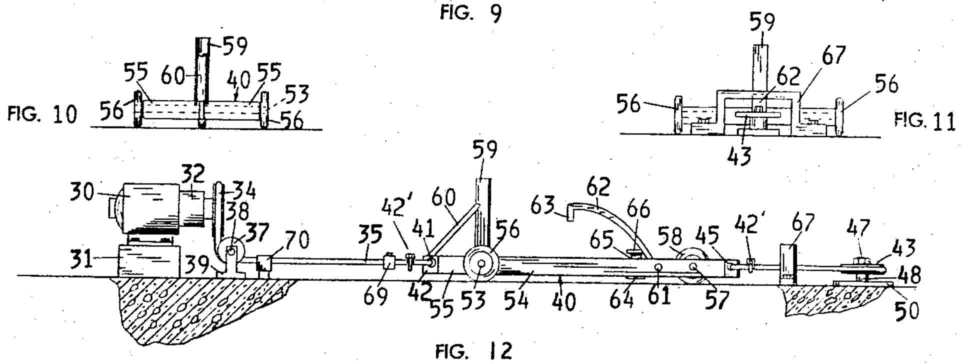
Figure 13:
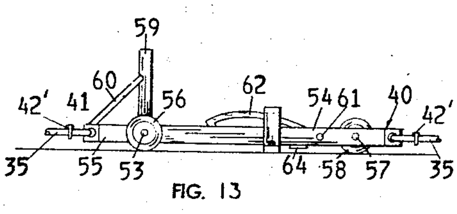
Figure 14:
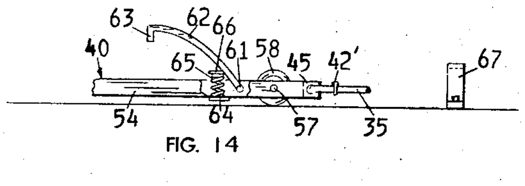
Figure 15:
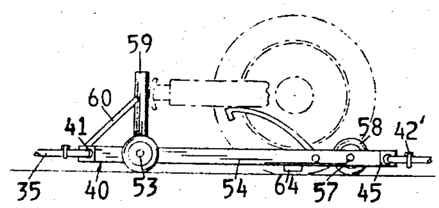
Figure 16:
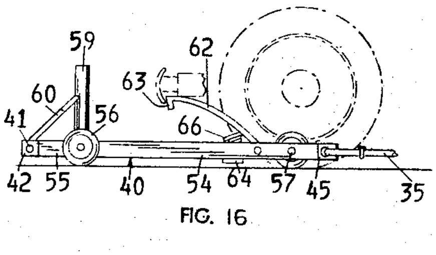
Figure 17A:
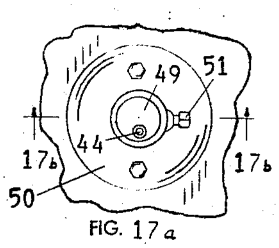
Figure 17B:
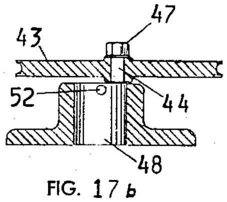
Figure 18:
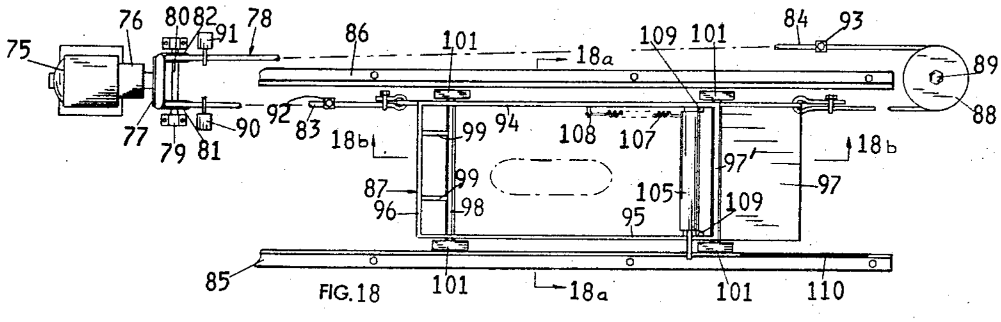
Figure 18A:
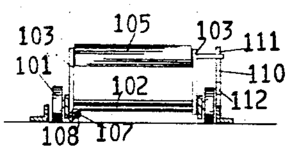
Figure 18B:
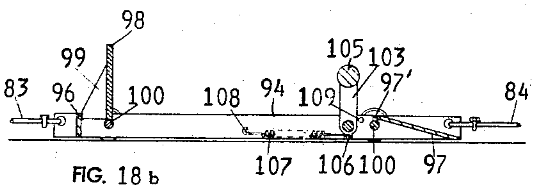
Figure 19:
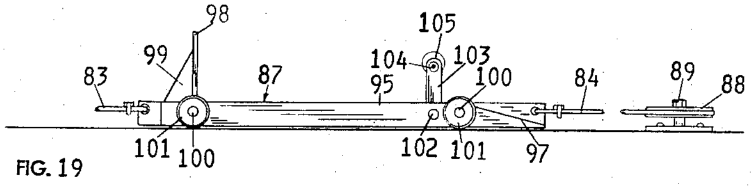

With the foregoing objects in view, together with such additional objects and advantages as may subsequently appear, the invention resides in the parts and in the construction, combination and arrangement of parts described, by way of example, in the following specification of certain presently preferred embodiments of the invention, reference being had to the accompanying drawings which form a part of said specification and in which drawings:

FIG. 1 is a side elevational view of an automobile parking device constituting a first embodiment of the invention, portions being broken away to conserve space, FIG. 2 is a top plan view of the embodiment shown in FIG. 1, portions being omitted to conserve space, FIG. 3 is a fragmentary side elevational sectional view taken on the line 3—3 of FIG. 2, FIG. 4 is an end elevational view as viewed from the left hand end of FIG. 1, FIG. 5 is an enlarged scale, transverse sectional view taken on the line 5—5 of FIG. 1, FIG. 6 is a circuit diagram of the controlling circuit for the device, FIGS. 7*a*, 7*b* and 7*c* show a typical installation of a plurality of devices shown in the preceding figures with the vehicles associated therewith in extreme outer position, mid-travel position and parked position respectively, FIG. 8 is a partial side elevation as viewed from the right hand side of FIG. 7*c*, FIG. 9 is a top plan view of a second embodiment of the invention, portions of the device being broken away to conserve space, FIGS. 10 and 11 are, respectively, front and rear elevational views of the car engaging dolly of the second embodiment, FIG. 12 is a side elevational view of the device, portions thereof being broken away to conserve space as in FIG. 9 and a portion of the floor being broken away to show the mounting of certain portions of the device, FIG. 13 shows the car engaging component of the device of said second embodiment when in its extreme retracted position to release or to be engaged by a vehicle, FIG. 14 shows the release of the means on the car engaging dolly as released during the initial forward movement thereof preparatory to engaging the bumper of a vehicle, FIG. 15 shows the car engaging dolly engaged with the bumper of a vehicle and moving it forward to the parking position, FIG. 16 shows the dolly moving in the opposition direction and moving a car from the parked position to the position of release, FIG. 17*a* is a top plan view of the mounting means for the rear idler sprocket, FIG. 17*b* is a medial sectional, side elevational view of the stud on which the rear idler stud is mounted, FIG. 18 is a top plan view of a third embodiment of the invention characterized by means bodily engaging the left front wheel of the vehicle to cause it to be rolled along the floor surface incident to moving the vehicle to and from the parked positions, portions of the device being broken away to conserve space, FIG. 18*a* is an enlarged scale transverse sectional view taken on the line **18*a*—18*a*** of FIG. 18, FIG. 18*b* is a longitudinal sectional view taken on the line **18*b*—18*b*** of FIG. 18, FIG. 19 is a side elevational view of the car engaging dolly and the actuating motor with the dolly at its extreme forward position the guide rail element at the side from which the view is taken being omitted for purposes of illustration of the dolly and associated parts of the mechanism.

Figure 20:
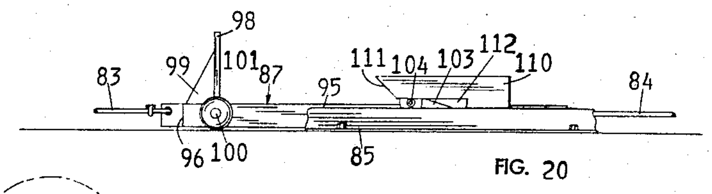
Figure 21:
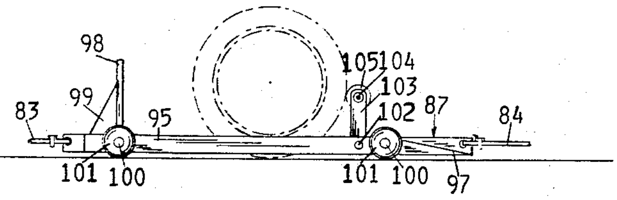
Figure 22:
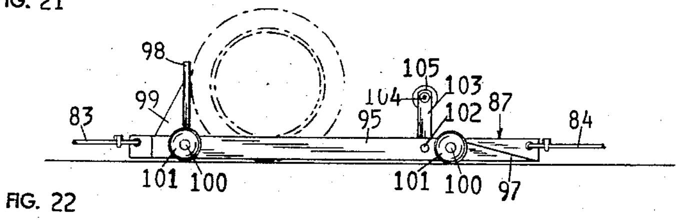

FIG. 20 is a side elevational view of the dolly at its rearmost position and showing particularly the means for disabling the vehicle wheel engaging means employed to move the vehicle forwardly, FIG. 21 is a side elevational view of the dolly and a vehicle left front wheel engaged thereby in the relative positions occupied in moving a vehicle into a parking position, and FIG. 22 is a view similar to FIG. 21 but showing the wheel and dolly in the position occupied in moving a vehicle from a parking position.

Referring first to FIGS. 1–10 of the drawings, the illustrated embodiment of the invention comprises an elongated track member 1 which may conveniently comprises a length of channel steel positioned with the upturned sides thereof to form edges 2, 2 and said track member being secured by bolts 3 to the floor of the parking space in the position traversed by the left front wheel of the vehicle to be parked by the device. At its forward end, the track member carries a mounting plate 4 which supports a reversible electric motor 5 and a bearing block 6 for a leadscrew shaft 7 which thence extends through the track member end wall 8 and along the track member rearwardly midway between the sides thereof and adjacent to the bottom of the track member and terminating in an end journaled in a bearing block 9 attached to the rearward end of the track member. At its forward end, forwardly of the bearing block 6, the shaft carries a large belt pulley 10 connected by a belt 11 to a smaller belt pulley 12 on the motor shaft. At its rear end, the track member terminates in a forwardly and upwardly sloping ramp 13 preferably formed by a heavy metal plate welded to the suitably inclined sides of the track member 1.

Mounted for transport along the track formed by the track member edges 2, 2 is a dolly or cart 14 comprising a body 15 formed from a sheet of metal which is downwardly curved as at 16 to conform to the outer diameter of the largest size of automobile tires in common use and having the ends thereof curved downwardly over and secured to parallel axles 17, 17 each of which carries at its opposite ends one each of a pair of grooved wheels 18 engaging the track edges 2, 2; the downward curved portion 16 thereof being disposed between the sides of the frame member and beng spaced above the leadscrew 7. At its lowest point, this body member carries a depending lug 18' which is engaged at its front and rear faces by a pair of compression springs 19, 19, the opposite ends of which are engaged by lugs 20, 20 which extend upwardly from a nut element 21 threadedly engaging the leadscrew 7. The nut element is provided with a flat bottom surface 22 which is parallel to and sufficiently close to the surface of the frame member 1 (see FIG. 5) to be prevented from turnng. It will be obvious that as the lead screw rotates in one direction, the dolly will be propelled forwardly along the track and when the leadscrew rotates in one direction, the dolley will be propelled forwardly along the track and when the leadscrew is rotated in the opposite direction, the dolly will be moved rearwardly.

Referring now specifically to FIGS. 7*a*, 7*b*, 7*c* and 8 there is shown a typical installation comprising a series of automobile receiving stalls by partitions P which are so close that while an automobile may be received in the stall there is no room to open or close a door for entrance or exit of a person. Also, the device is shown positioned in such adjacency to the wall at the left hand side of the car that the driver by bringing the car to be parked to the position shown in FIG. 7*a* with the left hand side of the car in close proximity to the adjacent wall is assured that the left front wheel has ascended the ramp and is supported by the dolly. He then leaves the car and locks it leaving the brakes released. Each device in each stall is provided with a separate double throw switch 23 which may be operated only by an individual key for that stall and the driver turns the switch with his key in the direction to operate the motor in a direction to move the dolly and the car engaged thereby forward into the stall as shown in FIG. 7*b*. As the nut element moves forward, it compresses the spring 19 which is at the rear of the lug 18' until sufficient force is developed in the spring to overcome the inertia of the vehicle. By this means, the motor is allowed to develop operating speed before being subjected to the full load of starting the car into movement. As the dolly and car reach the forward end of travel into the stall as shown in FIGS. 7*c* and 8, the dolly engages a normally closed limit switch 24 and opens that switch to stop the motor.

When the car is desired to be removed from the stall, the switch 23 is thrown in the opposite direction by use of the key and the normally closed limit switch 25, which starts rearward travel of the dolly, now being closed by reason of the forward movement of the dolly permits the completion of the circuit to operate the motor in the reverse direction, backing the car out until the dolly reaches the ramp at which time, the limit switch 25 is opened by the rearward travel of the dolly stopping the motor with the car in the position shown in FIG. 7*a* ready for occupancy and use.

FIGS. 9 through 17*b* show a second embodiment of the invention characterized by having the car moving means engageable with the front and rear faces of the front bumper of the car. In this embodiment of the invention, the driving power comprises a reversible electric motor 30 mounted on a base 31 and having a speed reduction unit 32 mounted thereon as a part of the motor frame structure, said unit having a horizontal drive shaft 33 carrying a driving sheave 34 for a cable 35 trained thereover. At each side of the sheave 34 and directly below the opposite sides thereof are a pair of idler sheaves 36 and 37 disposed at right angles to the sheave 24 and to the direction of the travel of the car when moved by the device and the idler sheave 36 being disposed to direct the cable along a line substantially coincident with the center of the path traversed by the car; said idler sheaves being mounted for free rotation on a shaft 38 carried by a bracket 39 fixed to the floor and supporting both ends of said shaft closely adjacent to the sprockets.

The end of the reach of the cable 35 passing under the sheave 36 is attached to the front end of a dolly 40 by suitable means such as being looped through a hole 41 in the forward tongue element 42 of the dolly frame structure and being closed by a clamp 42' the reach of the cable 35 which passes under the idler 37 extends rearwardly laterally parallel to the path of travel of the dolly and at one side thereof to and around a read idler sheave 43 carried by a vertical stud 44 secured to the floor adjacent the rearmost extent of travel of the dolly effected by the device and the end portion of said last named reach thence extending forwardly in alignment with the path of travel of the first named reach of the cable 35 and is attached to the rear tongue portion 45 of the dolly 40 by suitable means 42', as described previously.

A screw 47 threadedly engages the outer end of the stud 44 and the end of the screw engages the upper end of the hub of the sheave 43 to secure it on the stud, the other end of the hub engaging a shoulder formed by the larger diameter, cylindrical body 48 of which the stud 44 constitutes an integral, eccentrically disposed portion. The body portion 48 is mounted in the cylindrical socket 49 formed in a base 50 attached to the floor and is secured in rotative position therein by a setscrew 51; said body portion extending slightly above the upper end of the socket and being provided with a transversely extending bore 52 for reception of a capstan bar. The throw of the eccentric relation between the stud 44 and body 48 is sufficient so that the cable may be suitably tightened by rotating the base portion 48 in its socket by a capstan bar in the bore 48 and then locking the base portion and stud in adjusted position by the setscrew 51.

The dolly 40 comprises a transversely extending axle 53 fixed to and overlying points of juncture of a pair of horizontal, forwardly diverging rear frame members 54, 54 with the rearwardly diverging horizontal front frame members 55, 55, the abutting ends of said front and rear frame members and the axle 53 being preferably welded together to form a unitary structure in which the axle serves additionally as a transverse frame member. The ends of the axle 53 project outwardly beyond the juncture of the axle with the front and rear frame members and carry a pair of front wheels or casters 56, 56. The front ends of the front frame members engage opposite sides and are welded or riveted to the front tongue member 42 and the rear ends of the rear frame members are similarly welded or riveted to opposite sides of the rear tongue member 45. At the rear end of the dolly, forwardly of the tongue 45, the rear frame members 54, 54 support a transverse shaft 57 extending between them and on which the rear wheel or caster 58 is mounted for rotation.

Intermediate its ends, the axle 53 has the lower end of a vertically extending bumper engaging bar 59 secured thereto, preferably by welding, and a brace member 60 extends diagonally downwardly and forwardly from a point adjacent to the upper end of said bar 59 to the point of juncture of the frame members 55, 55 with the tongue 42 the ends of said brace being welded to the elements engaged thereby. Journaled in the rear frame members 54, 54 and extending transversely thereof slightly forwardly of the rear wheel or caster 58 is a rockshaft 61 having one end of a longitudinally curved, bumper engaging arm 62 welded thereto at the midlength of said rockshaft, said arm extending generally radially forwardly therefrom the curved configuration thereof presenting a convex upper surface. At its free end, the arm terminates in a downturned hook-like end portion 63. Slightly forwardly of the journals for the rockshaft 61, the rear frame members 54, 54 carry a flat transverse frame member 64 having the ends thereof welded or otherwise rigidly secured to the under sides of the frame members 54, 54. At its midlength, the transverse member 64 has the lower end of a compression spring 65 fixed thereto and the upper end of the spring is similarly secured to a bracket member 66 formed as an integral part of the arm 62 and so projecting from the arm that when the spring 65 is fully extended as in FIGS. 12, 14 and 16, the bracket is substantially normal to the axial line of the spring. By being attached both to the transverse frame member 64 and to the bracket 66, the spring additionally serves to hold the rockshaft 61 against such endwise movement as would disengage it from bearing engagement with either of the frame members 54, 54.

Fixed to the floor forwardly of the rear idler sheave 43 is a sufficient distance to enable it to effect its function, hereinafter to be described, is an arch member 67 which straddles the reach of the cable 35 passing around the idler 43 and his sufficient width to receive the rear end of the dolly 40 up to a point approximately midway between the front and rear wheels; said arch member further having an internal height sufficient to engage the bumper engaging arm 62 as the rearwardly moving dolly approaches the limit of its rearward travel and to cause said arm 62 to be moved down against the bias of the spring 65 to a point at which said arm cannot interfere with passage of a car over the dolly as will presently be explained.

Mounted on the bracket member 39 rearwardly of the idler 36 is a normally closed limit switch 68 adapted to be engaged and opened by a lug element 69 fixed to the cable 35 adjacent to the connection thereof to a front end of the dolly 40 and also mounted on the bracket 39 but rearwardly of the idler 37 is a second normally closed switch 70 adapted to be engaged and opened by a lug element 71 on the reach of the cable extending between the idler sheaves 37 and 43. These switches correspond to the switches 24 and 25 in the circuit shown in FIG. 6.

This embodiment of the invention, like the first embodiment, is proposed for use in connection with narrow stalls of the form shown in FIGS. 7*a*, 7*b*, 7*c* and 8 with the device disposed substantially in the center of the longitudinal line of the stall instead of at one side as shown in the first embodiment. In use, and assuming that the device is at the rear end of its travel as shown in FIG. 13, the car to be parked or placed in the stall is driven into the stall until the front bumper engages the bar 59. At this time, the front door of the car will be just outside of the end of the partition defining the stall. The driver leaves the car in neutral and with the brakes released and gets out of the car and locks it. He then operates the controlling key switch which corresponds to the key operated switch 23 of the first embodiment, in a direction to cause the motor 30 to operate in a direction causing the dolly 40 to move forward under the car. As it does so, the member 62 is released from under the arch member 67 and the spring 65 moves the free end of this arm upwardly to an extent at which the continued forward movement of the dolly will cause the free end of said arm to engage the rear side of the front bumper (see FIG. 15) and thus will propel the car forward into the stall until the lug 69 opens the limit switch 68 at the limit of forward movement of the car to stop the motor 30. When the car is to be removed from the stall, the key operated switch is operated to cause the motor to drive the chain and dolly in the opposite direction. The dolly moves rearwardly without the car until the bar 59 engages the front bumper and then backs the car out of the stall until the lug 71 which is then moving forward, opens the limit switch 70 to stop the motor. Incident to the last portion of this movement, the member 62 has again been brought under the arch member 67 so that it will offer no opposition to the movement of the car rearward off of the dolly or again forward over the dolly. The idle time between starting of the motor in either direction and the driving engagement of the car engaging members of the dolly with the car gives the motor sufficient time to develop the necessary momentum to overcome the inertia of the stationary car.

While a cable has been shown as the dolly operating means, a chain driven by a suitable sprocket in place of the sheave 34 could be employed.

FIGS. 18 through 22 illustrate a third embodiment of the invention which in some respects resembles the first embodiment in that one front wheel of the vehicle is engaged, and in other respects resembles the second embodiment of the invention in that (a) a cable operated dolly is employed and (b) the engaged wheel of the car is free to roll on the floor.

The power means employed is similar to that disclosed in the second embodiment. The driving motor 75 includes a speed reduction unit 76 driving a sheave 77 over which a cable 78 is trained. The motor mounting also includes a bracket portion 79 below the sheave 77 supporting a shaft 80 extending transversely of the axis of the sheave 77 and carrying a pair of idler sheaves 81 and 82 positioned below the opposite sides of the sheave 77 and operating to direct the reaches 83 and 84 of the cable parallel to each other along the floor toward the rear end of the device.

Mounted on the floor at each side of the path to be traversed by the left front wheel of a car to be parked by the device is a pair of guide rails 85 and 86 disposed respectively outside of and beneath the car and mounted for travel on the floor between these rails is a dolly 87 the front end of which is attached to the reach 83 of the cable 78 which extends from the sheave 77, thence beneath the idler 81 to the front end of the dolly. The reach 84 of the cable extends beneath the idler 82 and thence rearwardly outside of the guide rail 86 to a point in rear of the guide rail 86 and thence extends around an idler sheave 88 mounted on a vertical axis stud 89 carried by a supporting means such as shown in FIGS. 16*a* and 16*b* and thence is attached to the rear end of the dolly 87. Associated with the motor mounting assembly on the plate 79 are normally closed limit switches 90 and 91 disposed adjacent, respectively, to the cable reaches 83 and 84 said limit switches being adapted to be engaged by associated stop members 92 and 93, respectively, carried by the cable reaches with which the switches are associated and said limit switches operating in the same manner as the circuit shown in FIG. 6 to stop the motor when travel of the dolly in one direction or the other has reached a predetermined point.

The dolly 87 comprises a rectangular hollow frame formed by parallel longer side bars 94 and 95 united by cross member means to be presently described by welding or other appropriate process to form a unitary structure. The inner side bar 94 is somewhat longer than the outer bar 95 top rovide attaching means for the cable at each end of the dolly. At the front end of the dolly, the side bars 94 and 95 are united to a front cross bar 96 and at their rear ends, the side bars are united and held in parallel spaced relation by an upwardly and forwardly sloping ramp 97 welded thereto and having its forward end welded to the rear frame cross member 97'. Slightly rearwardly of the front cross bar 96, the dolly carries a transversely extending vertical plate 98 welded thereto and to a pair of reinforcing members 99, 99 welded both to the front face of the plate 98 and to the rear face of a front cross bar 96. The outer faces of the side bars 94 and 95 each carry a pair of laterally projecting axle studs 100 welded thereto and disposed adjacent the forward and rear ends thereof with the forward studs being in axial alignment with each other and the rear studs being in axial alignment with each other. Each of said studs carries a caster wheel 101 mounted thereon. The width of the dolly frame plus the thickness of the caster wheels and the length of the studs 100 is only slightly less than the distance between the guide rails 85 and 86 and since the ends of the dolly never project beyond the ends of the guide rails, no keeping means other than the guide rails is required to keep the wheels or casters 101 on the studs 100. As will be noted on the drawings, the wheels are of only sufficient diameter to keep the lower side of the dolly frame out of contact with the floor.

Forwardly of the rear casters 101, 101, the frame of the dolly carries a transverse shaft 102 to which is secured a pair of radially extending parallel arms 103, 103 disposed one each adjacent the inner faces of the side bars 94 and 95 and thus serving additionally to keep the shaft from being disengaged in its bearing relation with the side bars 94 and 95. The outer ends of the arms 103, 103 afford bearing engagement for the reduced diameter ends 104, 104 of a transversely extending roller 105, said roller and arms being movable between a vertical, tire engaging position shown in FIGS. 19 and 21 and a substantially horizontal position shown in FIG. 20. The arm 103 adjacent the dolly side mmeber or bar 94 includes an opposite radially extending lug 106 which is engaged by one end of a tension spring 107 having its other end attached to a stud 108 projecting laterally from the inner face of the side bar 94 whereby the bias of the spring 107 tends constantly to move the arms 103, 103 and roller 105 in a counterclockwise direction as best seen in FIG. 18*b*. The inner faces of the side bars 94 and 95 carry laterally projecting studs 109, 109 disposed to limit the extent of movement of the arms 103 and roller 105 in a clockwise direction to the substantially vertical position shown in FIG. 18*b*.

The sizbe of the space defined by the side bars 94 and 95, the front plate 98 and the rear cross member 97' as viewed in plan is considerably wider and longer than the width and diameter of the tire on the front wheel of a car to be engaged thereby as best shown in broken lines in FIGS. 18, 21 and 22. Assuming that the dolly is in its rearmost position, the outer guide rail 85 at the rear end thereof is provided with a cam member 110 having a rearwardly and downwardly sloping cam face 111 which terminates in a horizontal rearwardly extending slot 112. The reduced diameter end 104 of the roller 105 enaged by the arm 103 which is adjacent the frame member 95 extends laterally outwardly beyond the vertical plane of the cam member 110 and as the dolly has approached the rear end of its travel, this outwardly projecting end or shaft 104 has engaged the cam face 111 causing the arms 103, 103 and the roller 105 to be moved counterclockwise in opposition to the tension of the spring 107 until the shaft or end 104 has entered the slot 112 as shown in FIG. 20 thus bringing the top of the roller 105 substantially to the level of the top of the ramp 97. The car to be parked is driven into the stall defined by partitions on each side of the device such as shown, for example, in FIGS. 7–10, until the left front wheel has ascended the ramp and entered the space defined by the dolly frame. In this position, the front doors of the car are just rearwardly of the end of the partition permitting the driver to get out of the car and lock the car, leaving the brakes off and the car in neutral as in the other embodiments of the invention. A key switch similar to the switch 23 is operated to cause the motor to drive the dolly forward from the position shown inFIG. 22 to the position shown in FIG. 21. This first portion of travel does not move the car but brings the roller shaft 104 out of the slot 112 and up along the cam face 111 until the roller 105 and arms 103, 103 are in their vertical position with the arms engaging the stop studs 109. This idle movement of the dolly permits the motor to attain its operating speed. The continued forward movement of the dolly causes the roller 105 to engage the rear of the tire of the left front wheel and propel the car forward until the motor is stopped by the engagement of the stop or lug 92 with the stop switch 90.

When the car is to be removed from the stall, the motor is operated by the key operated switch in the opposite direction whereupon the dolly moves from the position shown in FIG. 21 to the position shown in FIG. 22 while the motor 75 develops its full operating speed and at that time, the plate 98 engages the tire and the dolly moves the car back to the rearmost position determined by the engagement of the stpo lug 93 with the limit switch 91. During the last portion of this rearward travel, the roller 105 will have been moved down by the cam face 111 and held by the slot 112 to permit the car to be backed out of the dolly and driven away.

Thus here has been provided a means by which motor vehicles may be parked in such close proximity to each other that access to the cars would be impossible. The devices of the invention permit such parking to be done by the drivers of the cars and do not require the presence of attendants to manipulate the cars for them. Moreover, the individual parking means associated with each space is also the locking means securing the vehicle parked thereby.

While various embodiments of the invention are shown, it is not to be inferred that each embodiment is restricted to the details of construction thus disclosed with each embodiment since it is obvious that any of the modifications shown in FIGS. 1–6, 9–17 and 18–22 may be used with the stall means of FIGS. 7*a*, 7*b*, 7*c* and 8, and it is intended that the stall arrangements shown in FIGS. 7*a*, 7*b*, 7*c* ad 8 may be applied to any of the several modiffications shown. Further, for example, the leadscrew means of the first embodiment may be employed, if desired, with the vehicle engaging means of the other embodiments and likewise, the cable or chain vehicle propelling means might be used as a substitute for the leadscrew. Moreover, while the formation of stalls defined by partitions closely confining the cars in the parked position contributes to the safety of cars so parked, it is not contended that such partitions are an absolute necessity since with cars parked as closely together as the present invention permits, access is virtually impossible and it is within the contemplation of the invention that for public parking situations employing coin operated time limited switches or equivalent devices instead of the key operated switches shown, such partitions would not be necessary.

In view of these considerations, the invention is not to be deemed to be limited to the specific details of construction of the individual embodiments thus disclosed and the invention will be deemed to include as well all such changes and modifications in the parts, and in the construction, combination and arrangement of parts as shall come within the purview of the appended claims.

We claim:

1. An automobile parking means adapted to be permanently installed on the floor surface of a space constituting a continuation of the surface of a driveway affording access of an automobile to that space and into and out of which space an automobile is to be moved to and from incident to the storage thereof in the space; said parking means including in combination, an automobile propelling and securing means, means confining movement of said propelling and securing means to movement in a fixed path on said floor surface, said propelling and securing means comprising a rectangular hollow frame, said hollow frame having a pair of spaced parallel longitudinal members joined by a pair of spaced transverse members, one of said spaced transverse members being inclined to provide a ramp permitting reduced resistance to a vehicle wheel entering the space defined by said hollow frame, a pair of spaced parallel arms pivotally mounted to respective longitudinal members and having a transversely extending roller mounted therebetween, said roller being mounted at the opposite ends of said parallel arms from said pivot, said parallel arms being biased toward a normally vertical position, a transverse rigidly mounted vertical plate member spaced from said roller and the distance between said vertical plate and said transverse roller being greater than the diameter of an automobile tire when said arms are pivoted to a horizontal position, power means for moving said propelling and securing means along said path with resultant propulsion of an automobile engaged thereby along the floor surface of the space and the driveway, manually operable means for actuation of said power means to cause movement of said propelling and securing means and an automobile in engagement therewith toward the position on said path from which it is remote at the time of such actuation.

2. The automobile parking means of claim 1, wherein said means confining movement of said propelling and securing means comprises a rail means secured to the floor surface and operative to guide said propelling and securing means.

3. The automobile parking means of claim 1, wherein said power means comprises a motor, a flexible member having its ends attached to opposite points on said propelling and securing means and having the portions thereof between said ends trained over a driving sheave operated by said motor at one end of said path, and an idler sheave at the other end of said path.

4. The automobile parking means of claim 2, wherein said rail means includes a cam member at one end thereof whereby said transversely extending roller is depressed to its lowermost position affording reduced resistance to a vehicle wheel exiting said space defined by said hollow frame.

5. In an automobile parking means a stall defined by a floor surface constituting an extension of the surface of the driveway affording access to said stall and parallel partitions extending from said floor surface and spaced apart a distance sufficiently greater than the width of an autmobile to be stored in said stall to permit the movement of an automobile into said stall by said parking means while preventing opening of the door to the automobile to an extent permitting the entrance or exit of a person therefrom, said parking means comprising an automobile propelling and securing means mounted on the floor surface of said stall, said propelling and securing means including a first means for engaging an automobile for movement thereof to storage position and a second means for engaging the automobile for movement thereof from the storage position and in which said parking means includes devices to disable said first engaging means as an incident to movement of said propelling and securing means from the storage position, power means including a motor, a flexible member having its ends attached to opposite points on said propelling means and having the portions thereof between said ends trained over a driving sheave operated by said motor at one end of said shaft and another sheave at the other end of said path for moving said propelling and securing means along the floor surface of said stall to and from a position of engagement and disengagement with an automobile at the entrance to the stall and a storage position within said stall and resultant moving of an automobile engaged thereby on the floor surface of the stall, rail means secured to the floor surface and operative to confine said propelling and securing means against movement laterally of said path, manually operable means for initiating movement of said propelling and securing means along said path to the position from which it is remote at the time of such initiation of movement, and means actuated by said propelling and securing means effective to stop the travel of said propelling and securing means upon reaching either end of said path of travel.

6. The automobile parking means of claim 5, wherein said propelling and securing means includes a first means having a face engagable with the rear of the front bumper of an automobile for moving the automobile into a storage position and a second means having a face engagable with the front face of a front bumper of the automobile for moving the automobile from the storage position, the distance between said faces of said members being greater than the distance between the rear and front faces of the automobile bumper engaged by said member.

7. The automobile parking means of claim 5, wherein said propelling and securing means comprises a rectangular hollow frame, said hollow frame having a pair of spaced parallel longitudinal members joined by a pair of spaced transverse members, one of said spaced transverse members being inclined to provided a ramp permitting reduced resistance to a vehicle wheel entering the space defined by said hollow frame, a pair of spaced parallel arms pivotally mounted to respective longitudinal members and having a transversely extending roller mounted therebetween, said roller being mounted at the opposite ends of said parallel arms from said pivot, said parallel arms being biased toward a normally vertical position, a transverse rigidly mounted vertical plate member spaced from said roller and the distance between said vertical plate and said transverse roller being greater than the diameter of an automobile tire when said arms are pivoted to a horizontal position, said transversely extending roller being said first means for engaging an automobile and said transverse rigidly mounted vertical plate member being said second means for engaging the automobile.

References Cited

UNITED STATES PATENTS

| | | | |
|---|---|---|---|
| 1,603,321 | 10/1926 | Cook | 214—16.1 |
| 2,427,802 | 9/1947 | Merritt | 214—16.1 |
| 2,633,809 | 4/1953 | Robinson et al. | 214—16.1 |
| 2,656,940 | 10/1953 | Sumners et al. | 214—16.1 |
| 2,691,448 | 10/1954 | Lontz. | |
| 2,714,456 | 8/1955 | Manaugh | 214—16.1 |
| 2,751,093 | 6/1956 | Theibault | 214—16.1 |
| 3,135,399 | 2/1964 | Saint-Andre | 214—16.1 |

FOREIGN PATENTS

| | | |
|---|---|---|
| 1,294,277 | 4/1962 | France. |
| 689,896 | 4/1953 | Great Britain. |
| 790,516 | 2/1958 | Great Britain. |
| 146,797 | 7/1931 | Switzerland. |

GERALD M. FORLENZA, *Primary Examiner.*

R. B. JOHNSON, *Assistant Examiner.*